Oct. 7, 1952   N. R. KRAUSE   2,612,974
POWER ACTUATED OVERLOAD RELEASE CLUTCH
Filed Feb. 14, 1947   5 Sheets-Sheet 1

INVENTOR.
Norman R. Krause
BY
Attorney

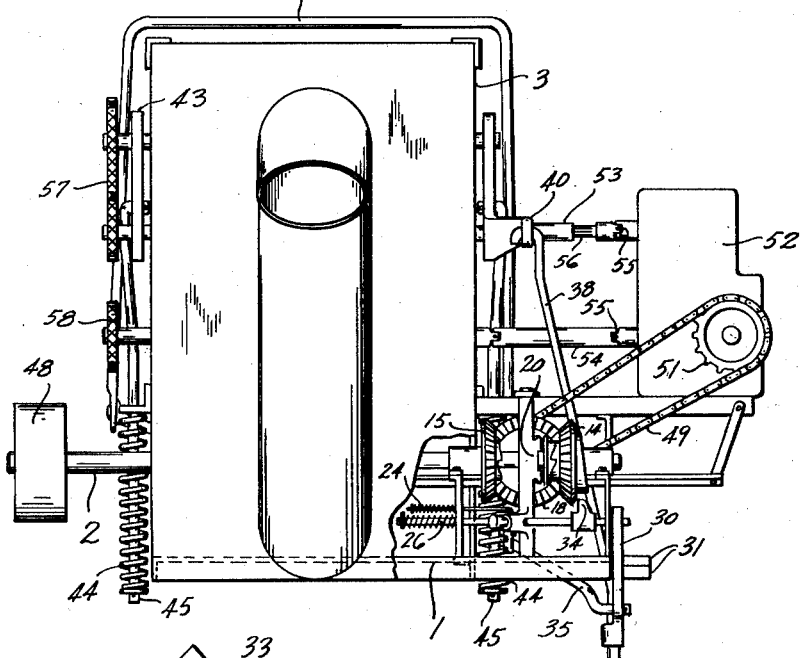
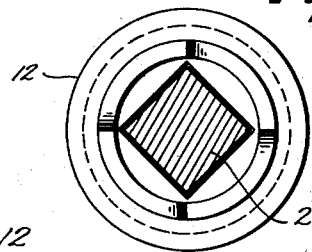
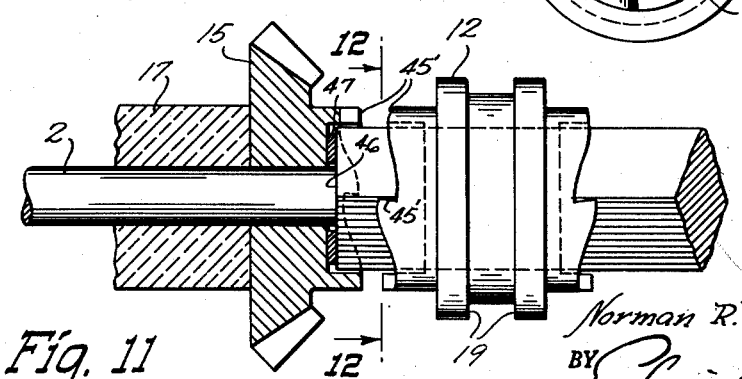

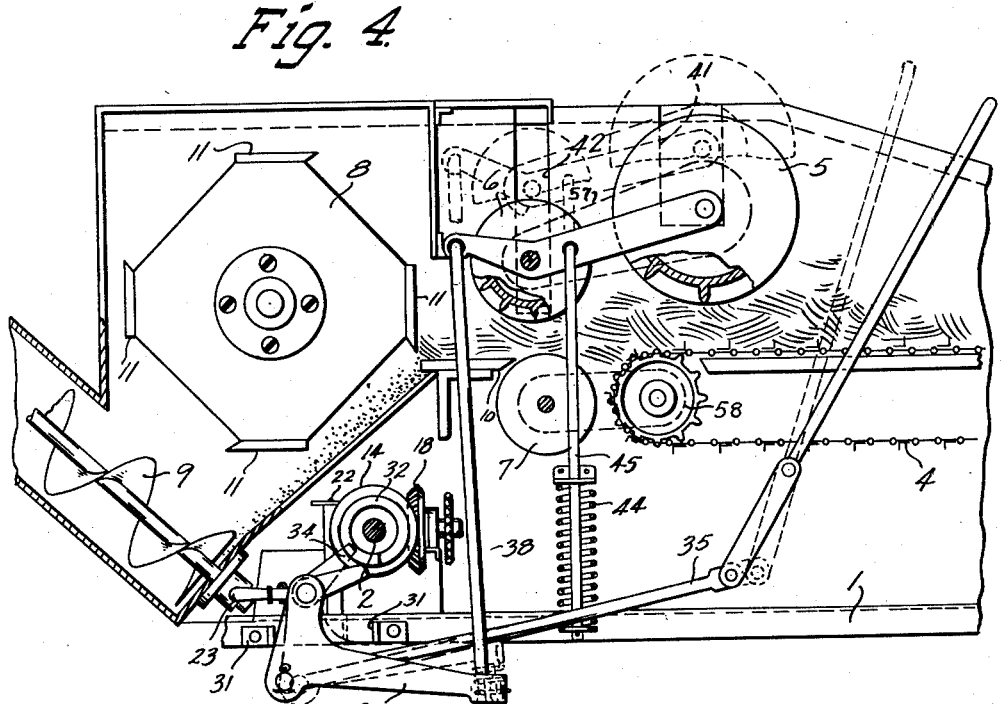

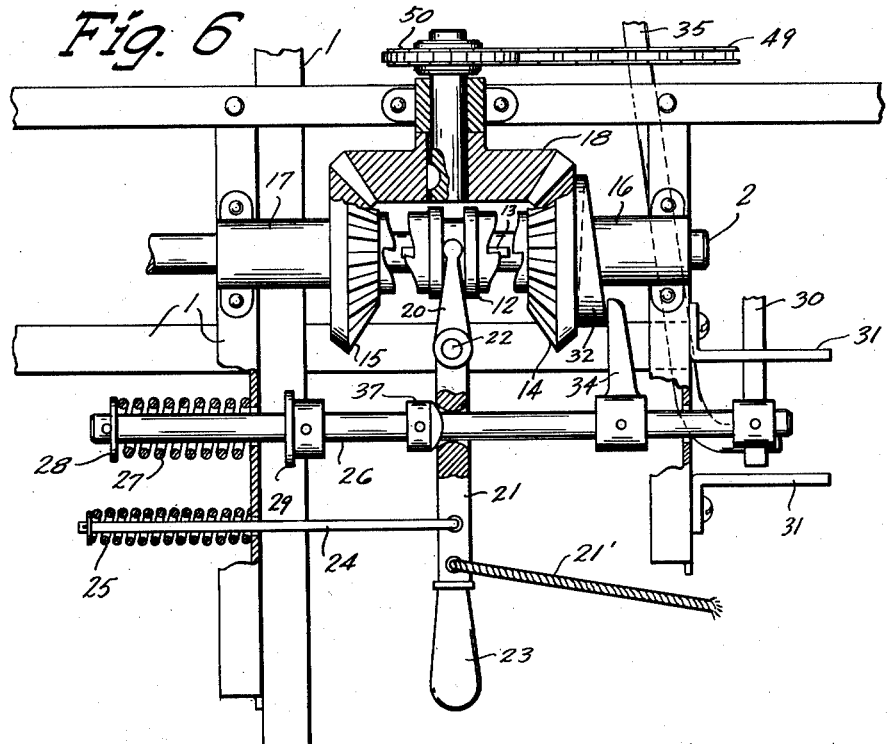
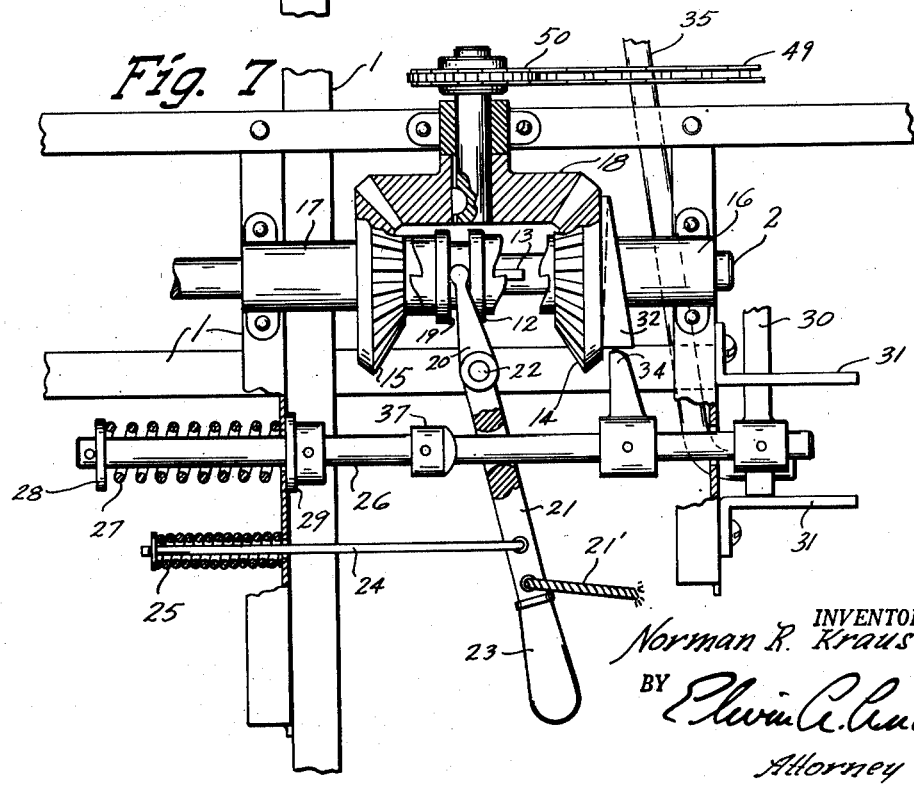

Oct. 7, 1952 N. R. KRAUSE 2,612,974
POWER ACTUATED OVERLOAD RELEASE CLUTCH
Filed Feb. 14, 1947 5 Sheets-Sheet 5
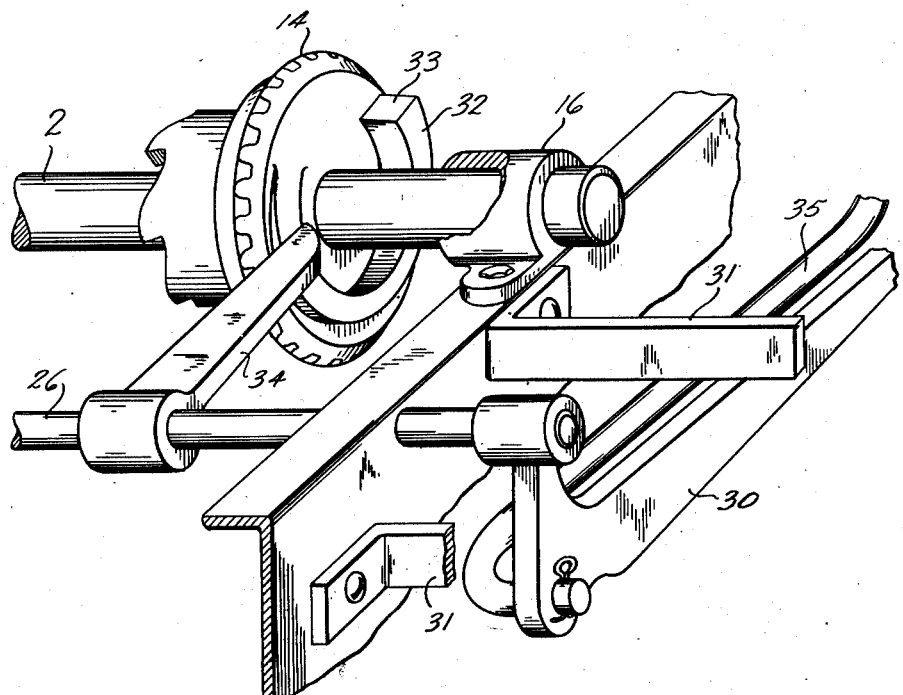
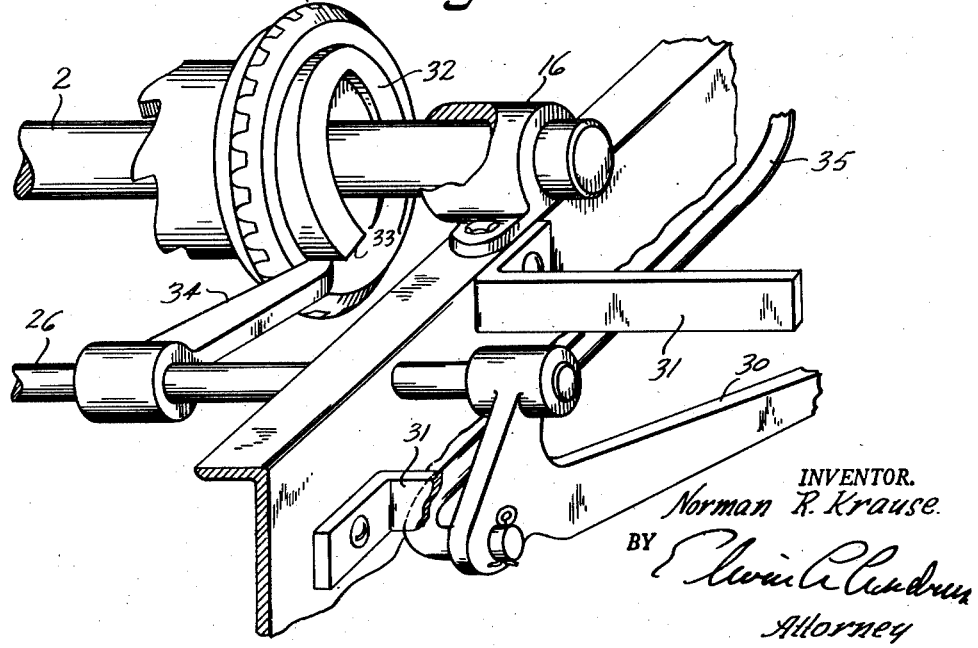
INVENTOR.
Norman R. Krause.
BY
Attorney Patented Oct. 7, 1952

2,612,974

UNITED STATES PATENT OFFICE 2,612,974

POWER ACTUATED OVERLOAD RELEASE CLUTCH

Norman R. Krause, Racine, Wis., assignor to J. I. Case Company, Racine, Wis., a corporation of Wisconsin Application February 14, 1947, Serial No. 728,617

11 Claims. (Cl. 192—150)

This invention relates to a clutch mechanism and is particularly directed to a power actuated safety clutch throwout mechanism for use with clutches in which the disengagement of the clutch is resisted as a result of the heavy torque load on the clutch.

The invention is to be adapted to the construction of clutches for various types of farm machinery such as silo-fillers and harvesters, and in which the clutches are usually of simple mechanically interlocking members employing teeth on the clutch faces having a small or negative pressure angle for the purpose of transmitting heavy loads. Such clutches present substantial resistance to disengagement of the teeth when under load.

With these conditions in view one object of the invention is to provide a clutch with a throwout mechanism which is operated by rotation of the drive shaft or power actuated means of the machine rather than by manual operation of the clutch shifter arm.

Another object of the invention is to provide for engagement of the power clutch release mechanism either automatically or manually.

A further object of the invention is to provide a simple and reliable means to effect disengagement of the clutch by the power actuated means.

Another object of the invention is to provide in a power clutch, release trip mechanism for the selective manual resetting of the mechanism and automatically therewith the re-engagement of the clutch or the initiation of the machine in reverse operation and automatically therewith the resetting of the trip mechanism.

Another object of the invention is to provide in a power clutch, release trip mechanism responsive to overloading of the machine for the reversing of the machine, and for reloading and the resetting therewith automatically of the release trip mechanism by power means.

Another object of the invention is to provide a clutch having increased driving power.

These and other objects of the invention will appear hereinafter in connection with the following description of the drawings illustrating several embodiments of the invention.

In the drawings:

Fig. 3 is a rear end elevation of the chopper with parts broken away to show the clutch;

Fig. 4 is a view similar to Fig. 1 showing feeding of forage to the machine, with broken lines showing automatic disengagement of the clutch by clogging of the feed rolls;

Fig. 5 is a top plan view of the clutch mechanism with parts broken away and sectioned and showing the clutch collar in engagement with the clutch drive pinion as in Fig. 1;

Fig. 6 is a view similar to Fig. 5 with the clutch collar riding free;

Fig. 7 is a view similar to Fig. 5 with the reverse drive clutch pinion engaged by the clutch collar and the cam contact arm down;

Fig. 8 is a perspective view of the cam and contact arm with the latter in engagement;

Fig. 9 is a view similar to Fig. 8 showing the arm being pushed out of the path of the cam;

Fig. 10 is a detail view of the teeth of the clutch;

Fig. 11 is an elevational view with parts broken away of a square shaft for the clutch collar; and Fig. 12 is a section taken on line 12—12 of Fig. 11.

Figure 1:
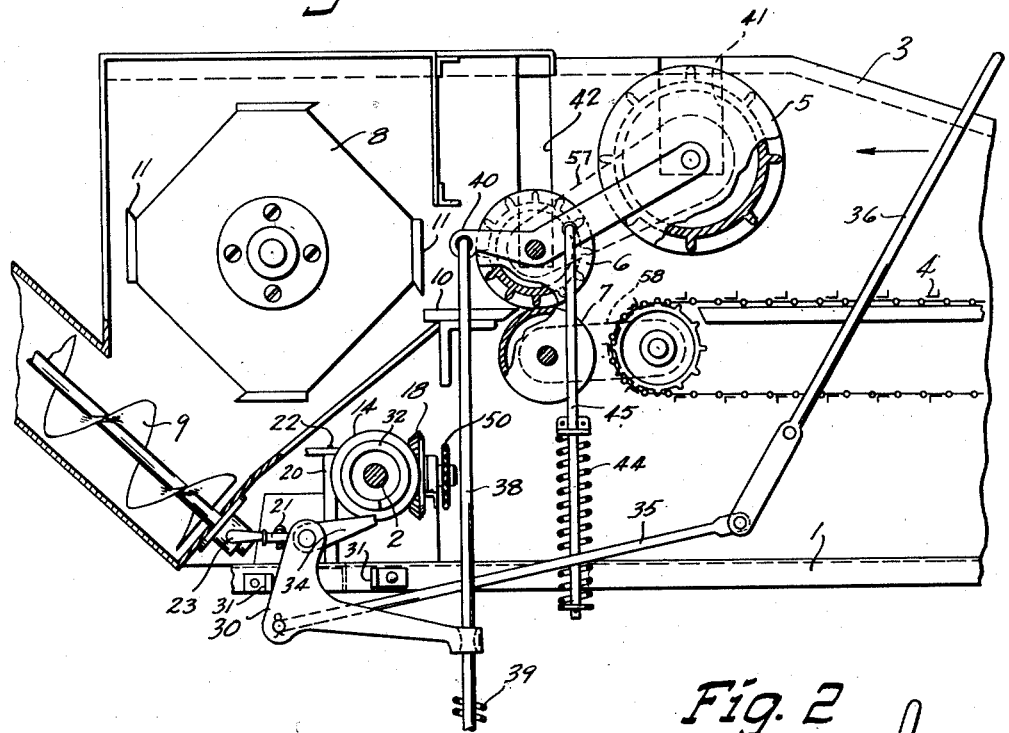
Figure 1 is a side elevational view of a portion of a forage chopper with the gear boxes and one side plate removed and parts in section, and with the clutch engaged and feed rolls and bail in normal position prior to feeding forage thereto.
Figure 2:
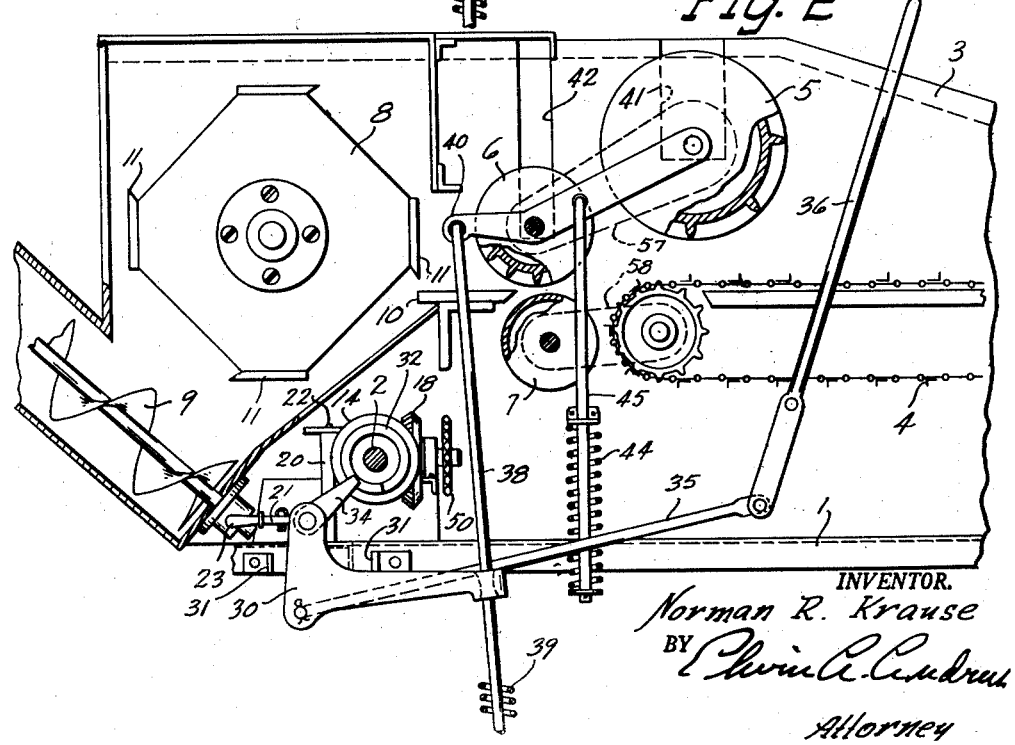
Fig. 2 is a view similar to Fig. 1 with the clutch disengaged by operation of the bail.

The drawings show, in part, a chopper with which the invention may be employed and comprising in general a frame 1 which supports the power actuated drive shaft 2 for driving all of the feeding mechanism of the machine and which governs the starting and stopping of such mechanisms. The mechanisms of the machine are enclosed in a housing or casing 3 secured to the frame 1.

The feeding mechanism in general comprises the conveyer rake 4 onto which the operator throws the fodder to be chopped, from a wagon, not shown, the floating feed rollers 5 and 6 operating in conjunction with the drum member 7, the cutter cylinder 8 and the conveyor 9. The fodder moves forwardly on carrier 4 beneath the first floating roll 5 and between the second floating feed roll 6 and onto the cutting plate 10 at the far edge of which it is cut by knives 11 on cutter cylinder 8. After cutting, the fodder falls down onto screw conveyor 9 for conveyance into the silo or other storage structure. The feeding and cutting mechanisms are supported on frame 1 and need not be further described as they form no part of the invention.

The clutch mechanism illustrated has a clutch collar 12 which is keyed to shaft 2 by feather key 13. Collar 12 slides axially of shaft 2 to engage the drive clutch pinion 14 when slid to the right, as shown in Fig. 5, and clutch pinion 15 when slid to the left, as shown in Fig. 7.

Pinions 14 and 15 float rotationally on drive shaft 2 and are coupled into driven engagement with the shaft when engaged respectively by the axially movable clutch collar 12. The bearing 16 for shaft 2 prevents axial displacement of pinion 14 and bearing 17 prevents axial displacement of pinion 15 when the pinions are selectively engaged by collar 12.

Pinion 14 meshes with the power output or driven shaft beveled gear 18 to rotate the same in a forward direction and pinion 15 meshes with gear 18 to drive the latter in a reverse direction as the pinions are selectively engaged by drive collar 12.

Collar 12 has a pair of spaced circumferential flanges 19 between which rides the operating yoke 20 of clutch lever 21.

Clutch lever 21 is pivoted to frame 1 at 22 and terminates in handle 23 at the outer end, whereby the lever may be manually operated to selectively engage and disengage the clutch collar 12 relative to either gear 14 or gear 15.

Clutch lever 21 may be spring biased to hold collar 12 in engagement with the forward drive pinion 14 by means of rod 24 secured to lever 21 near handle 23 and passing through frame 1, the rod being biased longitudinally by the spring 25 disposed between a washer on the end of the rod and the frame.

The present invention provides an automatic mechanism for disengaging the clutch in case of overload, and a power means for emergency manual disengagement for the same purpose.

A shaft 26 extends through or adjacent to lever 21 and is disposed for rotation and axial movement in suitable bearings in frame 1. Shaft 26 is biased axially in one direction by spring 27 extending between frame 1 and a washer 28 on the shaft. A collar 29 on shaft 26 bearing against the opposite side of frame 1 limits the axial movement of the shaft under the influence of the spring 27. The collar 29 additionally serves to resist rotation of shaft 26 by reason of its frictional engagement with frame 1 under the biasing influence of spring 27.

The rotational movement of shaft 26 is governed by the control crank arm 30 rigidly secured on the free end of the shaft and which abuts against stops 31 on frame 1 to limit its movement in either direction.

The clutch disengaging mechanism comprises the helical cam 32 on clutch pinion 14 which terminates in the generally perpendicular contact face 33, and the cam contact arm 34 which is rigidly secured to shaft 26 in radial alignment with cam 32.

Contact arm 34 is brought into the path of cam 32 by manual or automatic operation of arm 30 which is adapted to lift arm 34 into the path of the rotating cam through rotation of shaft 26.

For example, as shown in Fig. 1, the link 35 is connected at one end to the crank arm 30 and is pivoted at the other end to the bail 36. Bail 36 is pivoted to frame 1 and its upper bail end is disposed across the opening leading into the machine from casing 3. Should the operator push the bail toward the opening by accident or otherwise, arm 30 will be lifted against stop 31 to rotate shaft 26 in a direction effecting engagement of cam 32 by arm 34.

As arm 34 rides along cam 32, shaft 26 is pulled axially to the right, as shown in Fig. 6, and clutch lever 21 is engaged by a pusher collar 37 rigidly secured to the shaft 26 in a position to engage the lever 21. This shifts the inner end or yoke 20 of lever 21 to the left to disengage clutch collar 12 from clutch pinion 14. Both of the clutch pinions 14 and 15 then ride free on shaft 2 and the driven gear 18 ceases to rotate.

When the clutch is disengaged and the clutch collar 12 is in a neutral position as shown in Fig. 6, collar 12 is held against shifting through vibration of the machine or other disturbances by the spring 25 and the contact arm 34 in engagement with cam 32. The spring 27 holds contact arm 34 against cam 32 and spring 25 reacts to hold clutch lever 21 tightly against collar 37. By definitely locking the driving mechanism out of engagement the danger of the starting thereof through carelessness or vibration of the machine is substantially eliminated.

Arm 30 may be similarly operated to disengage the clutch by automatic means responsive to an overload determined by the floating feed rolls 5 and 6 which constitute a load governor.

For this purpose the automatic tilting of arm 30 to disengage the clutch occurs by vertical upward movement of a rod 38 which passes freely through the end of arm 30 and tends to support the same by a spring 39 between arm 30 and a washer and nut on the lower end of the rod.

The upper end of rod 38 is pivotally secured to an operating arm 40 which is in turn pivotally supported by the shafts of the floating feed rolls 5 and 6. The feed rolls 5 and 6, as they float upon the fodder passing into the machine serve to control the vertical movement of rod 38, and when an excessive amount of fodder is fed to the machine the rod 38 will be lifted to a point where spring 39 will lift arm 30 and rotate arm 34 into the path of cam 32.

The feed rolls 5 and 6 float in corresponding slots 41 and 42, respectively, in casing 3, and their shafts are journaled in the arm 40 at one end and in a corresponding connecting arm 43 at the other end to effect cooperative movement of the same.

Spring 39 is preferably spaced below arm 30 so that it will not effect rotation of shaft 26 against the frictional resistance of collar 29 until the spring is substantially compressed by engagement with arm 30 upon an overload. This provides for normal floating of the rolls without operation of the clutch throwout. Furthermore arm 34 is capable of substantial upward movement under normal floating without contacting cam 32.

Arms 40 and 43 are yieldingly downwardly urged by springs 44 acting through tension rods 45 pivotally connected with the corresponding arms between the rolls 5 and 6.

When contact arm 34 is in engagement with cam 32, as described, the cam effects axial movement of shaft 26 in a direction to compress spring 27 and will not permit return of shaft 26 to neutral position until contact arm 34 is again disengaged from cam 32. This may be accomplished in several ways.

For example, shaft 26 may be rotated to drop contact arm 34 out of engagement with cam 32, such as by manual pulling of the bail 36 forwardly, in a direction opposite to the arrow in Fig. 1, or by reversing the clutch by manual operation of lever 21 as shown in Fig. 7.

In the first case, where the overloading of the machine is not severe, pulling of bail 36 forwardly causing arm 34 to lower out of engagement with cam 32 allows spring 27 to move rod 26 and spring 25 to move lever 21 to the left to re-engage collar 12 and pinion 14 and restart the machine.

In the latter case clutch collar 12 is shifted into engagement with the reverse clutch pinion 15 by the operator. Upon reverse rotation of the driven shaft member 18 by pinion 15, the opposite clutch pinion 14 having the cam 32 is also reversely rotated.

The reverse rotation of cam 32 causes the contact arm 34 to axially follow the cam face 32 until the perpendicular face 33 of the cam engages the arm 34 pushing the latter downwardly and out of the path of the cam. Clutch collar 12 is then again free to be engaged with pinion 14 to drive the same forwardly, by reason of the movement of shaft 26 axially to the left by the biasing of spring 27 against frame 1.

As an additional safety feature of the invention, lever 21 may be shifted by the operator through the cable or rope 21' which is secured to the lever adjacent handle 23.

Rope 21' may extend upwardly to a wagon, not shown, from which the fodder is being loaded into the machine.

If for any reason the clutch mechanism should disengage through the cam action described and the feed mechanism of the machine stop, the operator can at any selected time pull on rope 21' to force clutch collar 12 into engagement with reverse drive pinion 15 to release the cam contact arm 34 and free the clutch for driving the machine as previously described.

The power disengagement of the clutch in case of emergency eliminates the requirement of providing the usual pressure angle between the clutch teeth 45' tending to disengage the clutch. With the present invention the teeth 45' may be set at an interlocking angle of from two to three degrees, as shown in Fig. 10, and greater driving power may thereby be transmitted by the clutch without danger of slipping out of engagement.

Under another construction of the clutch collar 12 and pinions 14 and 15 as shown in Figs. 11 and 12, the drive shaft 2 is formed square between the clutch pinions 14 and 15 to receive the clutch collar 12 and drive the same.

Fig. 11 illustrates only the left half of the assembly. As there shown, pinion 15 rides free on the round portion of shaft 2 between shoulder 46 of the square portion of the shaft and bearing 17. The hardened washer 47 is placed between pinion 15 and shoulder 46 to protect the bearing surfaces. The assembly of pinion 14 with shaft 2 is the same. The bearing 16 shown in Fig. 10 and bearing 17 shown in Fig. 11 cooperate with shoulders 46 of the square shaft to prevent lateral displacement of the pinions on shaft 2.

An arrangement of the automatic clutch and reverse gear with the driving shafts for rolls 6 and 7 is shown in Fig. 3.

A power input pulley 48 is mounted on one side of the chopper on shaft 2 extending through and beneath the chopper to the clutch mechanism located on the opposite side of the chopper. A chain 49 connects sprocket gear 50 on driven shaft member 18 of the clutch mechanism and gear 51 which drives the gears in gear box 52 mounted above the clutch mechanism.

Two flexible shafts 53 and 54 extend from the gear box 52 to drive rolls 6 and 7 from the gears in the box.

Shafts 53 and 54 are fitted with universal joints 55 and shaft 53 has a spline connecting element 56 to provide and allow for free movement of roll 6 in slot 42.

A sprocket chain 57 drivingly connects roll 5 on the outside of side plate 3 and on the side opposite gear box 52 with roll 6 to rotate roll 5 from gear box 52 through shaft 53. A sprocket chain 58 similarly connects roll 7 and the end drive sprocket for conveyer rake 4 to drive the same from gear box 52 through shaft 54.

The invention provides a safety clutch operating mechanism which is applicable to various machines, particularly farm machinery, where a power throwout is desirable in order to reduce or provide a negative pressure angle for the clutch teeth.

The construction serves to lock the clutch members out of engagement until the lock is released by manual tripping of lever 21 to a reverse clutch drive. Vibration of the machine will not trip the locking arm 34 off from the top of cam 32, since spring 27 definitely biases the arm against the cam.

The clutch may be actuated by various types of control for different machines, and may be shifted by a suitable remote control, as by cable 21'.

Various embodiments of the invention may be employed within the scope of the accompanying claims.

I claim:

1. In a rotary clutch for driving work members and having intermeshing teeth on a pair of drive and driven clutch members presenting substantial resistance to axial disengagement under heavy power transmittal loads, a power clutch throwout mechanism comprising a cam rotated in correlation to the rotation of the driven clutch member, a lever mechanism normally free of said cam and disposed to be moved into the path of said cam to be operated thereby to effect axial separation of said clutch members, safety mechanism operable by said work members to move said lever mechanism into the path of said cam, and means for effecting disengagement of said lever mechanism and cam and the resetting of said lever mechanism relative to said cam.

2. In a rotary clutch having intermeshing teeth on a pair of drive and driven clutch members presenting substantial resistance to axial disengagement under heavy power transmittal loads, a power clutch throwout mechanism comprising a cam on the driven clutch member, lever mechanism disposed to be tripped into the path of said cam to effect axial separation of said clutch members, said cam being adapted to release said lever mechanism therefrom upon reversal of the driven clutch member, and power means operable in response to axial separation of said clutch members to reverse the rotation of said driven clutch member and cam to release said lever mechanism.

3. In a clutch throwout mechanism assembled with a power driven shaft, a rotary driving clutch member disposed on said shaft in axial alignment with a rotary driven clutch member assembled on the shaft, positive interengaging means on the faces of said members to transmit torque therebetween and which resist disengagement under load, a cam on said driven member substantially opposite the clutch face thereof, means disposed to engage and disengage said clutch members, means adapted to be moved into engagement with said cam to force said first named means to disengage the clutch members upon forward rotation of the cam by said shaft, said cam engaging means being automatically moved out of engagement with said cam upon reverse rotation of said driven member and cam, and power means operable in response to axial separation of said clutch members to reverse the rotation of said driven member and cam to move said cam engaging means out of engagement therewith.

4. In a clutch throwout mechanism assembled with a power driven shaft, a rotary driving clutch member disposed on said shaft in axial alignment with a rotary driven clutch member assembled on the shaft, positive interengaging means on the faces of said members to transmit torque therebetween and which resist disengagement under load, a cam on said driven member substantially opposite the clutch face thereof, means disposed to engage and disengage said driving and driven clutch members, means adapted to be moved into engagement with said cam to force said means engaging and disengaging the clutch members to disengage the clutch members upon forward rotation of the cam by said shaft, and a second rotary driven clutch member engageable by said driving clutch member upon disengagement of the driving clutch member with said first named driven clutch member, and means coupling said driven clutch members whereby driving of said second named driven clutch member effects reverse rotation of the cam on said first named driven clutch member to reverse the rotation of the cam by said shaft to release said cam engaging means and make possible the re-engagement of said driving and first named driven clutch members.

5. In a clutch throwout mechanism assembled with a power driven shaft, a rotary driving member disposed on said shaft in axial alignment with a rotary driven member assembled on the shaft, interengaging clutch faces on said members, a pivoted clutch lever for engaging and disengaging said members, a control shaft disposed adjacent said lever and parallel with said drive shaft and disposed to rotate and to move axially, an abutment on said control shaft and adapted to engage said lever and to move the same in a direction to disengage the clutch members upon axial movement of said control shaft in one direction, a cam on said driven member substantially opposite the clutch face thereof, and an arm secured to said control shaft and disposed to engage said cam upon rotation of the control shaft to bias said control shaft axially and thereby operate the clutch lever by said abutment and effect disengagement of said clutch members.

6. In a clutch throwout mechanism assembled with a power driven shaft, a rotary driving member disposed on said shaft in axial alignment with a rotary driven member assembled on the shaft, interengaging clutch faces on said members, a pivoted clutch lever for engaging and disengaging said members, a control shaft disposed adjacent said lever and parallel with said drive shaft and disposed to rotate and to move axially, an abutment on said control shaft and adapted to engage said lever and to move the same in a direction to disengage the clutch members upon axial movement of said control shaft in one direction, a cam on said driven member substantially opposite the clutch face thereof, an arm secured to said control shaft and disposed to engage said cam upon rotation of the control shaft to bias said control shaft axially and thereby operate the clutch lever by said abutment and effect disengagement of said clutch members, and a manual safety lever disposed to rock said control shaft to effect engagement of said cam by said arm and thereby initiate operation of the clutch throwout mechanism.

7. In a clutch throwout mechanism assembled with a power driven shaft, a rotary driving member disposed on said shaft in axial alignment with a rotary driven member assembled on the shaft, interengaging clutch faces on said members, a pivoted clutch lever for engaging and disengaging said members, a control shaft disposed adjacent said lever and parallel with said drive shaft and disposed to rotate and to move axially, an abutment on said control shaft and adapted to engage said lever and to move the same in a direction to disengage the clutch members upon axial movement of said control shaft in one direction, a cam on said driven member substantially opposite the clutch face thereof, an arm secured to said control shaft and disposed to engage said cam upon rotation of the control shaft to bias said control shaft axially and thereby operate the clutch lever by said abutment and effect disengagement of said clutch members, and a crank connected to said control shaft to rock the same and effect engagement of said cam by said arm to initiate operation of the clutch throwout mechanism upon movement in response to predetermined actuating conditions.

8. A safety control device for machines and the like subject to overloading and stoppage and having a driving and a driven shaft, comprising axially engaging clutch elements operatively connecting said shafts, a cam rotated by one of said shafts, a pivotally mounted cam engaging lever disposed to move the clutch element of the other of said shafts under the influence of said cam to disengage said clutch and disconnect said shafts, and mechanical means connected to the machine and said cam engaging lever to rotate the latter into operative engagement with said cam upon overload of the machine.

9. In a power driven machine, a clutch device for automatically effecting stoppage of the machine, comprising axially engaging clutch elements operatively connecting the machine and power drive means therefor, means normally biasing the first of said elements in engagement with the second, a cam operatively connected for rotation with the second of said elements, a movable lever selectively engaging said cam, abutment means carried by said lever disposed to move the first of said elements out of engagement with the other upon movement of said lever in one direction, means biasing said lever in a direction making said abutment normally inoperative, and crank means carried by the machine and connected to said lever to effect pivotal movement of said lever into engagement with said cam for operatively positioning said abutment and disconnecting said elements.

10. A transmission mechanism for machines subject to overloading and stoppage comprising a drive shaft, a driven shaft operatively connected to drive the machine, spaced corresponding forward and reverse clutch elements rotatable upon said drive shaft and oppositely drivingly connected to said driven shaft, a clutch element driven and movably carried by said drive shaft between said spaced clutch elements selectively to engage the latter, means biasing said movable clutch element in one direction into engagement with one of said spaced clutch elements, cam means rotatively carried by said engaged clutch element and operably connected to said movable clutch element to move the same in the opposite direction out of engagement with said clutch element, a crank disposed to actuate said cam means in response to overloading and stoppage of the machine effecting the positive disengagement of said clutch elements, and manual means disposed to effect the engagement of said movable clutch element with the other of said driven clutch elements and the resetting of said cam means.

11. In a power driven machine subject to overloading and stoppage, a safety transmission comprising a driven shaft operably connected to the machine, a drive shaft, a gear carried by said driven shaft, a pair of gears carried by said drive shaft in spaced relation and engaging opposite sides of said first named gear to rotate the same in opposite directions, clutch elements carried by each of said pair of gears, a movable clutch element slidably carried upon said drive shaft between said first named clutch elements and connected to be rotated by said drive shaft, a lever disposed to move said movable clutch element selectively into engagement with either of said first named clutch elements, an abutment normally out of engagement with said clutch operating lever and disposed to be moved into engagement with said lever to disengage the movable clutch element, a cam on at least one of said driven clutch elements, a cam follower disposed to be moved into engagement with said cam and connected to said abutment to operate the same under the influence of said cam, and means responsive to overloading of the machine and disposed to move said follower into the path of said cam to effect disengagement of said movable clutch element, said follower being positively released from said cam upon engagement of said movable clutch element with the opposite driven clutch element.

NORMAN R. KRAUSE.

REFERENCES CITED

The following references are of record in the file of this patent:

UNITED STATES PATENTS

| Number | Name | Date |
| --- | --- | --- |
| 258,257 | Smith | May 23, 1882 |
| 876,053 | Heard | Jan. 7, 1908 |
| 876,590 | Robinson | Jan. 14, 1908 |
| 962,567 | Hancock | June 28, 1910 |
| 1,082,691 | Gorman | Dec. 30, 1913 |
| 1,306,030 | Stewart | June 10, 1919 |
| 1,651,099 | Parks et al. | Nov. 29, 1927 |
| 1,721,507 | Calkins | July 23, 1929 |
| 1,982,632 | Bodenschatz | Dec. 4, 1934 |
| 2,271,359 | Zeruneith | Jan. 27, 1942 |
| 2,309,152 | Woodruff | Jan. 26, 1943 |
| 2,368,987 | Henschker | Feb. 6, 1945 |
| 2,439,259 | McCormack | Apr. 6, 1948 |